United States Patent
Matsunaga et al.

(10) Patent No.: US 7,271,862 B2
(45) Date of Patent: Sep. 18, 2007

(54) LIGHT DIFFUSING SHEET, OPTICAL ELEMENT AND IMAGE DISPLAY

(75) Inventors: Takuya Matsunaga, Kearny, NJ (US); Atsushi Kitagawa, Ibaraki (JP); Takashi Shouda, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 179 days.

(21) Appl. No.: 10/511,164

(22) PCT Filed: Apr. 17, 2003

(86) PCT No.: PCT/JP03/04870

§ 371 (c)(1), (2), (4) Date: Oct. 14, 2004

(87) PCT Pub. No.: WO03/087894

PCT Pub. Date: Oct. 23, 2003

(65) Prior Publication Data

US 2005/0128379 A1    Jun. 16, 2005

(30) Foreign Application Priority Data

Apr. 18, 2002 (JP) ............... 2002-116404
Jul. 12, 2002 (JP) ............... 2002-203854

(51) Int. Cl.
*G02F 1/1335* (2006.01)
*G02B 5/02* (2006.01)

(52) U.S. Cl. .............. 349/64; 349/112; 359/599
(58) Field of Classification Search ............ 349/64, 349/112; 359/599
See application file for complete search history.

(56) References Cited

U.S. PATENT DOCUMENTS

| | | | |
|---|---|---|---|
| 6,445,504 B1* | 9/2002 | Suga et al. | 359/599 |
| 6,771,335 B2* | 8/2004 | Kimura et al. | 349/112 |
| 2002/0122257 A1* | 9/2002 | Suga et al. | 359/580 |
| 2003/0147140 A1* | 8/2003 | Ito | 359/599 |

FOREIGN PATENT DOCUMENTS

| | | |
|---|---|---|
| JP | 9-193332 | 7/1997 |
| JP | 2000-35508 A | 2/2000 |
| JP | 2002-107512 | 4/2002 |

* cited by examiner

*Primary Examiner*—Toan Ton
*Assistant Examiner*—Tai Duong
(74) *Attorney, Agent, or Firm*—Westerman, Hattori, Daniels & Adrian LLP (57) ABSTRACT

The present invention, a light diffusing sheet comprising a transparent resin layer having a minute unevenness formed on a surface thereof on at least one side of a transparent substrate, and a haze value of the light diffusing sheet is 30% or more, a ratio (Ra/Sm) of a center-line average surface roughness (Ra: μm) and an average height-depth spacing (Sm: μm) is 0.005 or less, and the Ra satisfies a relationship of $0.1 \leq Ra \leq 0.4$. The light diffusing sheet enables suppression of glaring of a screen and white blurring, while maintaining antiglare property, having excellent image visibility.

14 Claims, 1 Drawing Sheet

LIGHT DIFFUSING SHEET, OPTICAL ELEMENT AND IMAGE DISPLAY

FIELD OF THE INVENTION

The present invention relates to a light diffusion sheet used in order to suppress decrease of the screen visibility of a visual display, such as in liquid crystal displays (LCD), organic EL displays and PDP, and to an optical element having the light diffusion sheet concerned prepared thereto. Moreover, the present invention also relates to a visual display with the light diffusion sheet or the optical element concerned provided thereto.

BACKGROUND ART

Conventionally, in image viewing displays, such as LCD, an indoor lighting such as a fluorescent light, or incidence from sunlight from windows, or a reflection of operator's shadow etc. given to the viewing display surface sometimes aggravates visibility of pictures. Therefore, an light diffusion layer is provided, on display surface, in which fine unevenness structure showing antiglare property, formed in order to diffuse a surface reflected light, to stop a regular reflection of outdoor daylight and to prevent a reflection of outside environment for the purpose of improvement in the visibility of images. As a formation method of light diffusion layer, a method is mainly used in which a resin layer is formed from a coated layer having a resin containing fine-particles in dispersed state, because fine structure may be easily realized and at the same time excellent productivity may be realized by the method.

However, in case of high definition (for example, 120 ppi or more) LCDs, installation of the light diffusion layer thereto causes severe glaring on a surface of the LCDs by lens effect of a minute unevenness structure formed with a convexed configuration of particles on a surface of the light diffusion layer, leading to decrease in quality of image. Decrease in white blurring and in image clear property remarkably impairs displaying quality.

The present invention aims at providing a light diffusing sheet enabling suppression of glaring of a screen and white blurring, while maintaining antiglare property, having excellent image visibility, even applied for a high definition LCDs.

The present invention also aims at providing an optical element having the light diffusing sheet provided thereto, and further at providing an image display using the optical element.

DISCLOSURE OF THE INVENTION

As a result of investigation by the present inventors wholeheartedly performed in order to solve the problems, it was found out that a light diffusing sheet shown hereinafter might realize the object, resulting in completion of the present invention.

That is, the present invention relates to a light diffusing sheet comprising a transparent resin layer having a minute unevenness formed on a surface thereof on at least one side of a transparent substrate, wherein a haze value of the light diffusing sheet is 30% or more, a ratio (Ra/Sm) of a center-line average surface roughness (Ra: μm) and an average height-depth spacing (Sm: μm) is 0.005 or less, and the Ra satisfies a relationship of $0.1 \leq Ra \leq 0.4$.

In general, a mechanism of occurrence of glaring phenomenon of LCDs is understood to be caused by lens effect induced by a light with random strength from the lens effect of a surface unevenness structure, and therefore the present invention suppresses glaring by setting a haze value to be 30% or more. The haze value is preferably 35% or more, and more preferably 40% or more. In addition, in consideration of image visibility, the haze value is preferably 50% or less, and more preferably 45% or less. The haze value can be adjusted by surface diffusion of a transmitted light by a surface unevenness, and also by internal diffusion by added particles buried inside the transparent resin layer.

And it is understood that white blurring is to be caused by dispersion of a light from outside with a surface unevenness structure. It is understood that decrease in image visibility is to be caused by dispersion of transmitted light with a surface unevenness structure. Therefore, the present invention reduces glaring and white blurring of a screen, and suppresses decrease of image clearness, while maintaining excellent antiglare property, by controlling a ratio (Ra/Sm) of a center-line average surface roughness (Ra: μm) of a surface unevenness structure and an average height-depth spacing (Sm: μm) into 0.005 or less, and Ra to satisfy a relationship of $0.1 \leq Ra \leq 0.4$. When the ratio (Ra/Sm) exceeds 0.005, white blurring will increase and image visibility will fall. The ratio (Ra/Sm) is preferably 0.004 or less, and more preferably 0.003 or less. When the Ra exceeds 0.4 μm, even if the ratio (Ra/Sm) is 0.005 or less, characteristics, such as glaring, will fall. When the Ra is less than 0.1 μm, it is not preferable at point with inadequate antiglare property. On the other hand, the Ra is preferably 0.3 μm or less. When the ratio (Ra/Sm) is 0.005 or less, the Sm is not especially limited in relationship with the Ra, but the Sm preferably satisfies a relationship of $30 \leq Sm \leq 80$, and more preferably of $40 \leq Sm \leq 60$.

The present invention relates to a light diffusing sheet comprising a transparent resin layer having a minute unevenness formed on a surface thereof on at least one side of a transparent substrate, further comprising a low refractive index layer having a refractive index lower than a refractive index of the transparent resin layer on a surface with the minute unevenness, wherein a haze value of the light diffusing sheet is 30% or more, a ratio (Ra/Sm) of a center-line average surface roughness (Ra: μm) and an average height-depth spacing (Sm: μm) is 0.005 or less, and the Ra satisfies a relationship of $0.1 \leq Ra \leq 0.4$.

The present invention can suppress glaring and white blurring of a screen while maintaining antiglare property, by satisfying the surface property even when a low refractive index layer is provided, and thus a light diffusing sheet having excellent image visibility may be obtained. Moreover, a low refractive index layer can give antireflection function, which can effectively suppress white blurring in which scattered reflection on a surface of an image such as a display reduces visibility of black image of a screen.

In the light diffusing sheet, it is preferable that an image clearness of the surface with the minute unevenness is 20% or more. In order to obtain excellent image visibility, the image clearness is 20% or more, and in order to obtain still more excellent image visibility, it is preferable that the image clearness is 30% or more.

In the light diffusing sheet, it is preferable that a 60° gloss value on of the surface with the minute unevenness is 70% or less. The 60° gloss value that is 70% or less, effectively prevents reflection, and gives excellent antiglare property. The 60° gloss value is 60% or less, and preferably 40 to 50%.

In the light diffusing sheet, it is preferable that the transparent resin layer includes fine particles, and that the surface unevenness shape of the transparent resin layer is formed with the fine particles. Furthermore, it is preferable that the transparent resin layer is formed with ultraviolet curing resin.

Use of the fine particles may easily and certainly realize the transparent resin layer having a surface unevenness shape, and enables easy adjustment of a center-line average surface roughness (Ra) and an average height-depth spacing (Sm). Especially, use of organic fine particles as the fine particles is effective for suppression of glaring. Besides, ultraviolet curing type resins can efficiently form the transparent resin layer (light diffusion layer) using an easy processing operation by curing treatment with UV irradiation.

Furthermore, the present invention relates to an optical element comprising the light diffusing sheet on one side or both sides of an optical element. It further relates to an image display comprising the optical element.

BEST MODE FOR CARRYING OUT OF THE INVENTION

Figure 1:
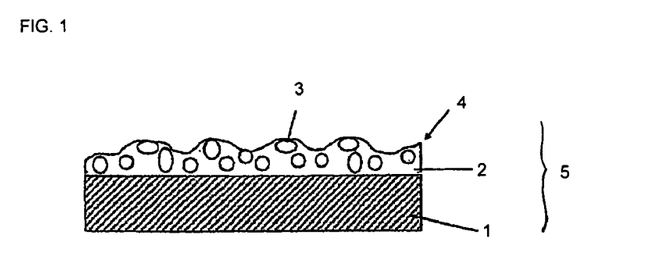
FIG. 1 is an example of a sectional view of a light diffusing sheet of the present invention.

Preferred embodiments of this invention will be described hereinafter, referring to drawings. FIG. 1 illustrates a light diffusion sheet 5 in which a light diffusion layer 4 comprising a transparent resin layer 2 having fine particles 3 dispersed therein is formed on a transparent substrate 1. Fine particles 3 currently dispersed in the transparent resin layer 2 forms unevenness shape on the surface of the light diffusion layer 4. In addition, although FIG. 1 illustrates a case where the transparent resin layer 2 consists of one layer, a light diffusion layer may also be formed of two or more transparent resin layers by forming separately transparent resin layer including fine particles between the transparent resin layer 2 and the transparent substrate 1.

Figure 2:
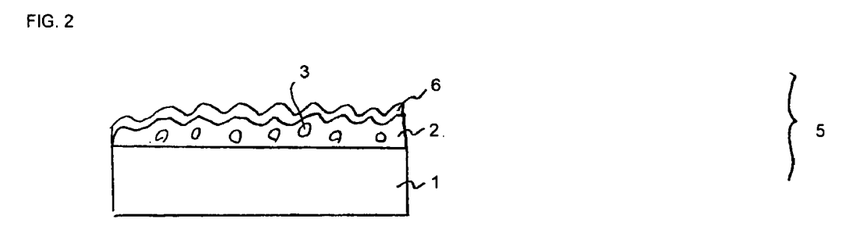
FIG. 2 is an example of a sectional view of a variant embodiment similar to the embodiment of FIG. 1 but with a low refractive index layer.

FIG. 2 illustrates a variant embodiment similar to the embodiment of FIG. 1 but with a low refractive index layer 6.

Figure 3:
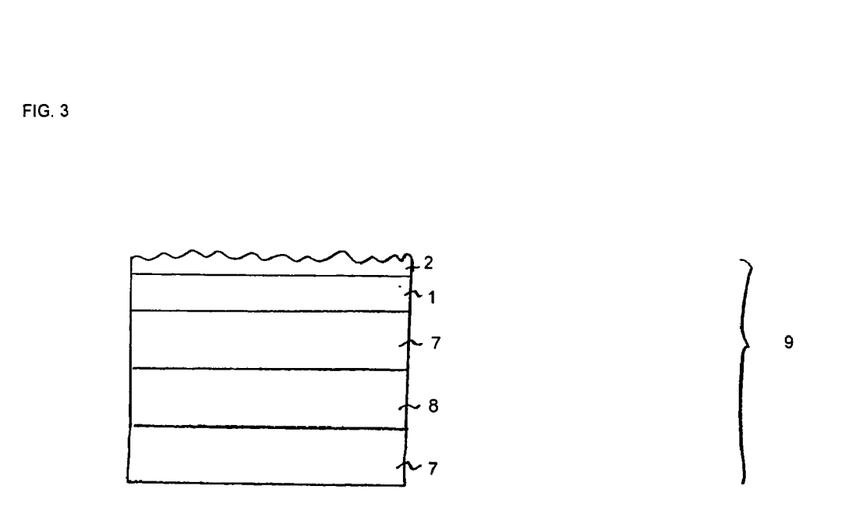
FIG. 3 is an example of a sectional view of a liquid crystal display (image display) comprising a light diffusing sheet in accordance with the present invention.

FIG. 3 illustrates a liquid crystal display 9 (image display) comprising a light diffusing sheet 6 in accordance with the present invention, and a liquid crystal cell 8 sandwiched between two optical elements 7.

As materials of the above-mentioned transparent substrate, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming transparent substrate, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; may be mentioned. And the polymer forming transparent substrate, sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Especially in optical property, a film having small birefringence is suitably used.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. These films have small retardation and small photoelasticity coefficient; therefore dissolve a defect of such as uniformity of polarizing plate, and have small moisture permeability; therefore are excellent in humidification durability.

Moreover, it is preferable that the transparent substrate may have as little coloring as possible. Accordingly, a protective film having a retardation value in a film thickness direction represented by Rth=$[(nx+ny)/2-nz] \times d$ of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a transparent substrate having a retardation value (Rth) of −90 nm through +75 nm in a thickness direction. The retardation value (Rth) in a thickness direction is preferably −80 nm through +60 nm, and especially preferably −70 nm through +45 nm.

As a transparent substrate, if polarization property and durability are taken into consideration, cellulose based polymer, such as triacetyl cellulose, is preferable, and especially triacetyl cellulose film is suitable.

A thickness of a transparent substrate 1 is determined appropriately, and in general, it is approximately 10 to 500 μm so that it may have suitable thinness, or in viewpoint of workability, such as strength and handling property. Especially it is preferably 20 to 300 μm, and more preferably 30 to 200 μm.

A forming method of the transparent resin layer 2 having fine unevenness structure surface is not especially limited so long as it is formed on the transparent substrate 1, but any proper methods may be adopted. For example, a method of forming fine unevenness structure on a surface of a material itself that forms the transparent resin layer 2 may be mentioned. As illustrative examples, a method may be mentioned in which rough surfacing processing is beforehand given to the surface of the film used for formation of the above described transparent resin layer 2 by proper manners, such as sandblasting, roll embossing, and chemical etching to give fine unevenness structure to the film surface. And, a method may also be mentioned in which additional coating of another transparent resin layer 2 is separately given on the transparent resin layer 2, and fine unevenness structure is given by a transfer method with metal mold etc. onto the transparent resin layer surface concerned. Furthermore, as shown in FIG. 1, fine unevenness structure is given by dispersing fine particles 3 in the transparent resin layer 2 may be mentioned. In the formation method of these fine unevenness structures, two or more kinds of methods may be used in combination, and a layer may be formed in which different type of fine unevenness structures are compounded on the surface. In the formation method of the above described resin coated 2, a method of forming a transparent resin layer 2 that contains the fine particles 3 dispersed therein is preferable in view of easiness and reliability of formation of fine unevenness structure.

Hereinafter, a method will be described in which fine particles 3 are included in a dispersed state to prepare a transparent resin layer 2. As resins that form the transparent resin layer 2 concerned, resins in which the fine particles 3 may be dispersed, strength sufficient as a coated layer after the transparent resin layer is formed and transparency are demonstrated may be used without any limitation. Resins of thermosetting type, resins of thermoplastic type, resins of ultraviolet curable type, resins of electron beam curable type, resins of two components mixing type, etc. may be mentioned. And among them, a resin of ultraviolet curable type that may form an light diffusion layer efficiently through easy processing operation by curing processing with UV irradiation is suitable.

Among examples of resins of ultraviolet curable type are various kinds of resin, such as polyester based, acrylic based, urethane based, amide based, silicone based, and epoxy based resins, and ultraviolet rays curing type monomers, oligomers, and polymers etc. are also included. As a resin of ultraviolet curable type used preferably, for example, a resin that has functional groups with ultraviolet rays polymerizable property and a resin that includes, as a component, acrylic based monomers and oligomers having two or more, especially 3 to 6 of functional groups concerned may be mentioned. And, ultraviolet rays polymerization initiator is blended in resins of ultraviolet curable type.

In the formation of transparent resin layer 2, additives, such as leveling agents, thixotropy agents, and antistatic agents may be used. Use of thixotropy agent (silica, mica, smectite, etc. having particle diameter of 0.1 or less μm) can easily form a fine unevenness structure on a transparent resin layer (light diffusion layer) surface of projecting particles.

As fine particles 3, material having transparency, such as various metal oxide, glass, and plastic, may be used especially without any limitation. For example, among these examples are, inorganic oxide fine particles, such as silica, alumina, titania, zirconium oxide, calcium oxide, tin oxide, indium oxide, and antimony oxide; cross-linked or linear organic fine particles comprising various polymers, such as polymethylmethacrylates, polystyrenes, polyurethanes, acryl-styrene copolymers, benzoguanamine, melamines, and polycarbonates; and silicone based fine particles, etc. In addition, as inorganic fine particles, such as silica, crushed silica powder etc. may also be used and bead particles may also be used as organic fine particles. Use of organic fine particles is effective for suppressing glare. These fine particles 3 may be used independently or, two or more kinds may be selected and used in combination. An average particle diameter of the fine particles is 1 to 10 μm, and preferably 2 to 5 μm.

Formation method of the light diffusion sheet is not especially limited, but proper methods may be adopted. For example, a resin (for example an ultraviolet curable resin: coating solution) comprising the fine particles 3 is coated on the above described transparent substrate 1, then curing processing being given after dried to form a transparent resin layer 2 giving unevenness shape on the surface. Coating of the above described resin is carried out by proper methods, such as fountain, die coater, casting, spin coat, fountain metalling, and photogravure etc.

A haze value, an average height-depth spacing (Sm), a center-line average surface roughness (Ra), etc. on a surface of a minute unevenness structure of the formed transparent resin layer 2 can be satisfied by suitably adjusting a mean particle diameter and a ratio of fine particles 3 included in the coating liquid, a thickness of the transparent resin layer 2, etc.

Although the percentage of the fine particles 3 included in the above described coating solution is not especially limited, in order to suppress the glaring, it is preferably 6 to 20 parts by weight to a resin 100 parts by weight. Besides, although the thickness of the transparent resin layer 2 is not especially limited, it is preferably approximately 3 to 6 μm, and more especially 4 to 5 μm.

A low refractive index layer having antireflection function may be provided on a surface with the minute unevenness of the transparent resin layer 2. Materials of the low refractive index layer are not especially limited, as long as they have refractive indexes lower than that of the transparent resin layer 2. Methods of forming the low refractive index layer are not especially limited, a wet coating method that is simpler as compared with a vacuum deposition method etc. is preferable.

As materials for forming the low refractive index layer, for example, resin based materials such as ultraviolet curing type acrylate resins; hybrid type materials having inorganic fine particles, such as colloidal silica, dispersed in a resin; and sol-gel based materials using metal alkoxides, such as tetra-ethoxy silane and titanium tetra-ethoxide may be mentioned. The forming materials of the illustrated low refractive index materials may be polymers already polymerized, and may be oligomers or monomers used as precursor thereof. In order to give soil-resistance to a surface, compounds including fluorine groups may be used as each material. There is a tendency for the low refractive index layer material having a large content of inorganic constituents to be excellent in view of mar resistance, and sol-gel based materials are especially preferable.

Perfluoro alkyl alkoxy silanes may be illustrated as sol-gel based materials including the fluorine groups. As perfluoro alkyl alkoxy silanes, for example, compounds expressed with a general formula (1): $CF_3(CF_2)_nCH_2CH_2Si(OR)_3$ (where R represents alkyl group of carbon numbers of 1 to 5, and n represents an integer of 0 to 12) may be mentioned. Specifically, for example, trifluoro propyl trimethoxy silane, trifluoro propyl triethoxy silane, trideca fluoro octyl trimethoxy silane, trideca fluoro octyl triethoxy silane, heptadeca fluoro decyl trimethoxy silane, and heptadeca fluoro decyl triethoxy silane may be mentioned. Among them compounds having the above-described n of 2 to 6 are preferable. In formation of the low refractive index layer, sols in which silica, magnesium fluoride, etc. are dispersed in alcoholic solvents may be added. In addition, additives, such as metal salts and metallic compounds, may suitably be blended.

A thickness of the low refractive index layer is not especially limited, and is about 0.05 to 0.3 μm, and especially preferably 0.1 to 0.3 μm.

Moreover, optical elements may be adhered to the above described transparent substrate 1 of the light diffusion sheet in FIG. 1. As example of optical elements, a polarizer may be mentioned. The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, dyes is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A transparent protective film is usually provided on one side or both sides of the above described polarizer to be used as a polarizing plate. As a transparent protective film, materials excellent in transparency, mechanical strength, heat stability, water shielding property, isotropy, etc. are preferable. As transparent protective films, a film of same material as the transparent substrate in the above described illustration may be used. As the above described transparent protective film, a transparent protective film whose both sides, surface side and backside, are formed from same polymer material may be used, and also a transparent protective film whose both sides are formed by different polymer materials etc. may be used. In many cases, it is preferable that the transparent protective film has small optical anisotropies, such as retardation. As polymers for forming the transparent protective film, triacetyl cellulose is most preferable. In providing the light diffusing sheet on one side or both sides of a polarizer (a polarizing plate), a transparent substrate of the light diffusing sheet can serve also as a transparent protective film of the polarizer. A thickness of the transparent protective film is not especially limited, and it is about 10 to 300 μm in general.

In lamination of the light diffusing sheet to the polarizing plate, a transparent protective film, a polarizer, and a transparent protective film may sequentially be laminated onto the light diffusing sheet, and a polarizer and a transparent protective film may be sequentially laminated onto the light diffusing sheet.

As the opposite side of the polarizing-adhering surface above-mentioned transparent protective film, a film with a hard coat layer and various processing aiming for sticking prevention and diffusion or anti glare may be used. A hard coat processing is applied for the purpose of protecting the surface of the polarization plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Besides, a sticking prevention processing is applied for the purpose of adherence prevention with adjoining layer. In addition, the above described hard coat layer and sticking prevention layer etc. may be built in the protection film itself, and also they may be prepared as an optical layer different from the protection layer.

Moreover, for example, a hard coat layer, a primer layer, an adhesive layer, a pressure sensitive adhesive layer, an antistatic layer, an electrically conductive layer, a gas barrier layer, a steam barrier layer, a moisture barrier layer, etc. may be inserted in between layers of polarizing plates, or these may be laminated on a surface of the polarizing plate. Besides, in a stage for forming each layer of the polarizing plate, for example, if required, various characteristics may be improved by adding or mixing conductive particles, antistatic agents, various particles, plasticizers, etc. into forming materials of each layer.

As optical elements, an optical film in which other optical elements (optical layers) is laminated to the above described polarizing plate may be used on the occasion of practical use. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate. In an elliptically polarizing plate, a polarizing plate with an optical compensation and the like, a light diffusing sheet is disposed on a side of the polarizing plate.

Furthermore, if necessary, treatments for giving various kinds of characteristics, functions, such as mar resistance, durability, weather resistance, wet heat resistance, heat resistance, moisture resistance, moisture permeability, antistatic property, electric conductivity, improvement in adhesive properties between layers, mechanical strength improvement etc. may also be performed, or insertion, lamination, etc. of functional layers may also be performed.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal biaxial stretching and a biaxially stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a trans-flective type polarizing plate is combined with above described retardation plate respectively.

Although a laminating of the above described light diffusion sheet to the optical element and of the various optical layer to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, which at least one layer of the optical element is laminated with the light diffusion sheet, while a layer not prepared the light diffusion sheet an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows light diffusion nature.

Proper method may be carried out to attach an adhesive layer to the optical element, such as the polarizing plate, the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or a optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical element prepared with the light diffusion sheet of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, light diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Although illustrative description of the present invention will be hereinafter given with reference to Examples, the present invention is not limited at all by these Examples.

Example 1

A coating liquid was obtained by mixing to a urethane acrylic based ultraviolet curing type resin (refractive index 1.51) 100 parts by weight, polystyrene beads 14 parts by weight with a mean particle diameter of 3.5 μm as fine particles, a benzophenone based photopolymerization initiator 5 parts by weight, a thixotropic agent (smectite) 2.5 parts by weight, and a solvent (toluene) measured so as to give 32% by weight of solid content. The obtained coating liquid was applied on a triacetyl cellulose, and then curing treatment was given by UV irradiation after dried for 5 minutes at 120° C., and a light diffusing sheet that has a transparent resin layer having a surface of a minute unevenness structure with a thickness of about 5 μm was produced.

Example 2

A light diffusing sheet was produced in a same manner as in Example 1, except for having further provided a low refractive index layer of 0.1 μm (material: florine denaturant polysiloxane, refractive index: 1.39) having a refractive index lower than the refractive index (1.51) of the transparent resin layer on a minute unevenness structure surface of the transparent resin layer in Example 1.

Example 3

A light diffusing sheet was produced in a same manner as in Example 1, except for having changed the amount of addition of polystyrene beads with a mean particle diameter of 3.5 μm as fine particles in Example 1 into 12 parts by weight.

Example 4

A light diffusing sheet was produced in a same manner as in Example 1, except for having used a coating liquid adjusted to 34% of solid content concentration in Example 1.

Example 5

A light diffusing sheet was produced in a same manner as in Example 1, except for having changed the amount of addition of polystyrene beads with a mean particle diameter of 3.5 μm that is fine particles in Example 1 into 16 parts by weight.

Comparative Example 1

A coating liquid was obtained by mixing to a urethane acrylic based ultraviolet curing type resin (refractive index 1.51) 100 parts by weight, silica beads 14 parts by weight with a mean particle diameter of 2.5 μm as a fine particles, a benzophenone based photopolymerization initiator 5 parts by weight and a solvent (toluene) measured so as to give 40% by weight of solid content in Example 1 as a coating liquid. A light diffusing sheet was produced in a same manner as in Example 1, except for having formed a transparent resin layer on a surface of a minute unevenness structure with a thickness of about 4 μm using the obtained coating liquid.

Comparative Example 2

A coating liquid was obtained by mixing to a urethane acrylic based ultraviolet curing type resin (refractive index 1.51) 100 parts by weight, silica beads 14 parts by weight with a mean particle diameter of 2.5 μm as fine particles, a benzophenone based photopolymerization initiator 5 parts by weight, a thixotropic agent (smectite) 2.5 parts by weight and a solvent (toluene) measured so as to give 40% by weight of a solid content in Example 1. A light diffusing sheet was produced in a same manner as in Example 1, except for having formed a transparent resin layer of a surface of a minute unevenness structure with a thickness of about 8 μm using the obtained coating liquid.

Comparative Example 3

A light diffusing sheet was produced in a same manner as in Example 1, except for having changed the amount of addition of polystyrene beads with a mean particle diameter of 3.5 μm as fine particles in Example 1 into 6 parts by weight.

Comparative Example 4

A light diffusing sheet was produced in a same manner as in Comparative Example 2, except for having used silica beads 13 parts by weight with a mean particle diameter of 1.4 μm as fine particles in Comparative Example 2.

Shapes (Sm, Ra) of a surface unevenness structure of a light diffusing sheet obtained by the Examples and the Comparative Examples were measured using Surfcom 470A by Tokyo Seimitsu Co., Ltd. as a stylus type surface roughness measurement machine, according to JIS B 0601 (1982), as a measurement length of 3 mm.

A haze value of a light diffusing sheet was measured by a haze meter by Suga Test Instruments Co., Ltd. according to JIS K 7105. Image clearness was measured using (ICM-1) made by Suga Test Instruments Co., Ltd., according to JIS K 7105-1981. Moreover, a 60° glossiness was measured using digital variable glossimeter UGV-5DP made by Suga Test Instruments Co., Ltd. according to JIS K 7105-1981. Table 1 shows the results.

(Evaluation)

Following evaluations were performed using a sample that is a polarizing plate in which a polarizing plate (185 μm) was adhered on a transparent substrate of a light diffusing sheet obtained by the Examples and the Comparative Examples adhering on a glass substrate. Table 1 shows the results. Each sample gave excellent antiglare property under indoor fluorescent lamp.

(Glaring)

A glass substrate side of a sample was placed on a mask pattern (200 ppi) fixed on a light table, and glaring degree (glaring) was estimated by visual inspection on following criteria.
OO—no glaring observed
O—almost no glaring observed
Δ—a little glaring observed but practically no problem
X—glaring observed (White Blurring)

A black tape was attached on a glass substrate side of a sample, and a degree of whiteness of a surface of a minute unevenness structure of a light diffusing sheet under indoor fluorescent lamp (700 luxes) was estimated by visual inspection on following criteria.
OO—no surface whiteness observed
O—almost no surface whiteness observed
Δ—surface whiteness observed, but practically satisfactory
X—surface is white, and image not visible (Image Visibility)

A glass substrate side of a sample was placed on a mask pattern fixed on a light table, a pattern image when focus suited was observed with a magnifying lens, and estimated on following criteria.
OO—outline of image does not fade
O—outline of image hardly fade
Δ—outline of image fades, but practically satisfactory
X—outline of image fades

TABLE 1

| | Haze (%) | Ra (μm) | Ra/Sm | Image clearness (%) | Glossiness (%) | Glaring | White blurring | Image visibility |
|---|---|---|---|---|---|---|---|---|
| Example 1 | 42.1 | 0.20 | 0.004 | 30.5 | 54.5 | O | O | O |
| Example 2 | 39.8 | 0.19 | 0.004 | 31.0 | 38.0 | O | OO | O |
| Example 3 | 40.5 | 0.14 | 0.002 | 35.9 | 62.5 | O | O | O |
| Example 4 | 36.0 | 0.10 | 0.001 | 40.5 | 67.0 | O | O | O |
| Example 5 | 44.3 | 0.25 | 0.005 | 15.5 | 47.6 | O | O | O |
| Comparative Example 1 | 25.5 | 0.42 | 0.011 | 6.0 | 21.4 | Δ | X | X |
| Comparative Example 2 | 14.3 | 0.23 | 0.005 | 39.1 | 39.8 | X | O | O |
| Comparative Example 3 | 24.0 | 0.08 | 0.001 | 71.4 | 82.1 | Δ | O | O |
| Comparative Example 4 | 11.1 | 0.16 | 0.004 | 41.2 | 41.7 | X | O | O |

INDUSTRIAL APPLICABILITY

A light diffusing sheet of the present invention and an optical element provided with the light diffusing sheet the light diffusing can suppress decrease in visibility of a screen, and may suitably be applied for image displays, such as liquid crystal displays (LCDs), flat panel displays (FPDs), organic EL displays, and PDPS.

The invention claimed is:

1. A light diffusing sheet comprising a transparent resin layer having a minute unevenness formed on a surface thereof on at least one side of a transparent substrate,
    wherein a haze value of the light diffusing sheet is 30% or more,
    a ratio (Ra/Sm) of a center-line average surface roughness (Ra: μm) and an average height-depth spacing (Sm: μm) satisfies a relationship of 0<(Ra/Sm)≦0.005, and the Ra satisfies a relationship of 0.1≦Ra≦0.4.

2. The light diffusing sheet according to claim 1, wherein an image clearness of the surface with the minute unevenness is 20% or more.

3. The light diffusing sheet according to claim 1, wherein a 60° gloss value of the surface with the minute unevenness is 70% or less.

4. The light diffusing sheet according to claim 1, wherein the transparent resin layer includes fine particles, and the surface unevenness shape of the transparent resin layer is formed with the fine particles.

5. The light diffusing sheet according to claim 1, wherein the transparent resin layer is formed with an ultraviolet curing resin.

6. An optical element comprising the light diffusing sheet according to claim 1 provided on one side or both sides of an optical element.

7. An image display comprising the optical element according to claim 6.

8. A light diffusing sheet comprising a transparent resin layer having a minute unevenness formed on a surface thereof on at least one side of a transparent substrate, further comprising a low refractive index layer having a refractive index lower than a refractive index of the transparent resin layer on a surface with the minute unevenness,
- wherein a haze value of the light diffusing sheet is 30% or more,
- a ratio (Ra/Sm) of a center-line average surface roughness (Ra: μm) and an average height-depth spacing (Sm: μm) satisfies a relationship of $0<(Ra/Sm)\leq 0.005$, and the Ra satisfies a relationship of $0.1\leq Ra\leq 0.4$.

9. The light diffusing sheet according to claim 8, wherein an image clearness of the surface with the minute unevenness is 20% or more.

10. The light diffusing sheet according to claim 8, wherein a 60° gloss value of the surface with the minute unevenness is 70% or less.

11. The light diffusing sheet according to claim 8, wherein the transparent resin layer includes fine particles, and the surface unevenness shape of the transparent resin layer is formed with the fine particles.

12. The light diffusing sheet according to claim 8, wherein the transparent resin layer is formed with an ultraviolet curing resin.

13. An optical element comprising the light diffusing sheet according to claim 8 provided on one side or both sides of an optical element.

14. An image display comprising the optical element according to claim 13.

* * * * *